C. W. MILLET.
CASTER WHEEL.
APPLICATION FILED DEC. 31, 1917.

1,310,287.

Patented July 15, 1919.

Inventor
C. W. Millet
By
Attorneys

UNITED STATES PATENT OFFICE.

CHARLES W. MILLET, OF JOHNSTOWN, NEW YORK.

CASTER-WHEEL.

1,310,287.   Specification of Letters Patent.   Patented July 15, 1919.

Application filed December 31, 1917. Serial No. 209,694.

*To all whom it may concern:*

Be it known that I, CHARLES W. MILLET, a citizen of the United States, residing at Johnstown, in the county of Fulton and State of New York, have invented certain new and useful Improvements in Caster-Wheels, of which the following is a specification.

This invention relates to caster and similar wheels and is designed more particularly as an improvement over the caster wheels shown in my prior Patent No. 1,205,559, issued November 21, 1916. In the patented structure as well as in the present structure the wheel comprises a hub, a body of compressible material fitted thereon, and disks fitted onto the hub and bearing against the opposite sides of the body and compressing the same. However, in the patented structure the disks are flat sided and I have found that after such a wheel has been used for a considerable length of time the rim portion of the body will be forced inwardly toward the hub of the wheel to such an extent as to wedge apart the peripheral portions of the disk, there being no means provided for preventing relative spreading of the peripheral portions of the disk, and in fact the disks being connected to each other only at their centers. In fact it would be undesirable to provide any direct connecting means between the peripheral portions of the disks and yet it is essential that there be some provision against spreading of their said peripheral portions. The present invention, therefore, has as its primary aim to so form the side disks that relative spreading of their peripheral portions will be positively prevented and the compressible body of the wheel will be permanently firmly compressed at and adjacent the tread portion thereof so as to also effectually prevent any loosening of the tread portion of the body or a fraying-out of the same.

The invention further aims to provide side disks of such form that in the completed caster wheel the compressible body of the wheel will be more firmly compressed at and adjacent its tread surface than at its mid portion.

Figure 3:
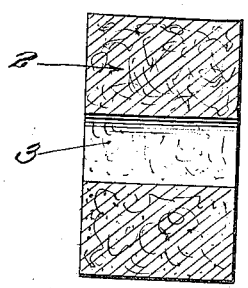
Fig. 3 is a sectional view illustrating the initial condition of the body of the wheel.

In the drawings the numeral 1 indicates the hub of the caster wheel which hub is initially of tubular cylindrical form. The body of the wheel is indicated in general by the numeral 2, and the said body may be formed of felt, leather, or in fact any other suitable compressible material, the body being initially substantially of the form shown in Fig. 3 of the drawings, or in other words, substantially cylindrical and provided centrally with a transverse opening 3 for the reception of the tubular hub 1. By reference to Fig. 3 it will be observed that initially the sides or ends of the body 2 are flat and occupy parallel planes.

Figure 1:
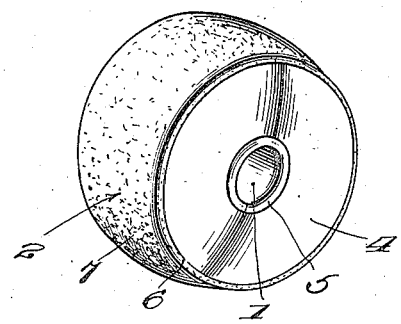
Figure 1 is a perspective view of the caster wheel embodying the present invention.
Figure 2:
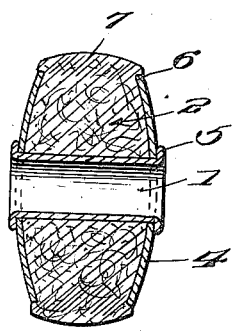
Fig. 2 is a vertical sectional view taken axially therethrough.

The body 2 of the caster wheel is fitted onto the hub 1 and is confined and firmly compressed between side disks or plates indicated by the numeral 4. These disks are of concavo-convex form and are so disposed that their concave faces will bear against the opposite side faces of the body 2 and in the manufacture of the wheel the disks 4 are firmly forced toward each other upon the hub 1 and the ends of the hub are riveted down, as indicated by the numeral 5. Thus the body 2 becomes compressed between the said disks and the compression is, of course, greater at the points of engagement of the peripheral portions of the disk against the body than at the central portion of the body. In other words, from its central portion, the body is gradually compacted to a greater degree toward its periphery or tread portion, as clearly indicated by the cross-sectional lines in Fig. 2. Also as clearly shown in the said Fig. 2, the disks 4 at their peripheries, being of less diameter than the body 2 in its initial form, become sunken into the opposite faces of the body, as indicated by the numeral 6, so as to be prevented from coming in contact with a highly polished floor or other surface over which the caster is to travel. It will also be understood by reference to Figs. 1 and 2 that due to the compression force exerted by the disks upon the body 2, the peripheral portion of the body will be bulged outwardly as indicated at 7, so as to provide a transversely rounded tread.

It will be understood from the foregoing description of the invention that by providing side disks of the form illustrated and described, the body of the wheel is not only of increasing degrees of compactness from its center toward its tread but also, even though great weight be imposed upon the caster wheel, the wedging of the body between the peripheral portions of the disks cannot possibly cause relative spreading of these portions of the disks due to their concavo-convex form and to the manner of their disposal against the faces of the body.

Having thus described the invention, what is claimed as new is:

1. A caster wheel comprising a tubular one-piece hub having smooth exterior walls, an annular body of compressible material surrounding the hub, and concavo-convex disks of substantially the same diameter as the body fitted upon the smooth exterior walls of the hub with their concave faces bearing directly against and compressing the material at the opposite sides of said body whereby the body is compacted in gradually increasing degrees from its central portion to its tread, the peripheral portions of the disks being sunken into the said opposite sides of the body, and the peripheries of said disks being located inwardly of the tread of the wheel.

2. A caster wheel comprising a tubular one-piece hub, an annular body of compressible material thereon and of greater thickness at the hub than at the tread of the wheel, and concavo-convex disks of substantially the same diameter as the body fitted upon the opposite ends of the tubular hub with their concave faces bearing directly against and compressing the material at the opposite side faces of said body whereby the material is compacted in gradually increasing degrees from the hub to the tread of the wheel, the ends of the hub being provided with laterally extended retaining flanges bearing against the outer faces of the disks to hold said disks against relative lateral separation.

In testimony whereof I affix my signature.

CHARLES W. MILLET. [L. S.]